United States Patent Office 3,548,595
Patented Dec. 22, 1970

3,548,595
VACUUM-ASSIST POWER BRAKE
Franz Pech, Neu Isenburg, and Peter Spahn, Hattingen (Ruhr), Germany, assignors to Alfred Teves G.m.b.H., Frankfurt am Main, Germany, a corporation of Germany
Continuation-in-part of application Ser. No. 657,619, Aug. 1, 1967, now Patent No. 3,470,697. This application July 25, 1968, Ser. No. 790,489
Claims priority, application Germany, July 26, 1967, T 34,419
(Filed under Rule 47(a) and 35 U.S.C. 116)
Int. Cl. F15b 7/08, 15/10
U.S. Cl. 60—54.6      5 Claims

ABSTRACT OF THE DISCLOSURE

A vacuum-assist power-brake system wherein a power drum has a floating-vacuum power cylinder carrying a control-valve body whose valve member is actuated by a rod from the brake pedal for shifting the member relatively to the body and thereby vent one of the power-cylinder chambers to the atmosphere while the other is exposed to reduced pressure of the engine; force transmission between the power piston and the master-cylinder piston is effected via a force-transmitting rod while a force-distribution system with a characteristic distribution ratio is provided between the valve body and valve member and the force-transmission rod. The force distributor may be a lever arrangement in which the distribution is determined by the ratio of arm lengths, a spring system in which a respective spring is provided between the rod and the valve member and valve body with predetermined force constants, or a cam system whose distribution is in proportion to the ramp angles. In addition, the force distributor may include a reaction disk and supplementary resilient elements.

---

This application is a continuation-in-part of the commonly assigned application Ser. No. 657,619 filed Aug. 1, 1967, now U.S. Pat. No. 3,470,697.

The present invention relates to a vacuum-assist power-brake system and in particuuar to improvements in force-transmitting means between the actuating and output sides thereof.

It has already been proposed to provide power-brake systems of the so-called booster or vacuum-assist type in which a power piston of relatively large surface area subdivides a drum-shaped housing into a pair of working chambers or compartments. A valve body can be carried by the piston and is designed to cooperate with a slide-valve member, axially shiftable by a rod coupled with the brake pedal of the vehicle, to selectively block and unblock a passage interconnecting the chambers and venting one of them to the atmosphere. The other chamber is maintained under reduced pressure by communication with the suction line of the intake-manifold of the engine or some suitable reduced-pressure reservoir. A force-transmitting rod between the power piston and the master cylinder transmits force to the latter and enables the actuation of the hydraulic brakes by a force augmented by the power piston. The force of the latter is, of course, proportional to the product of the pressure differential applied thereacross and the surface area of the piston. A certain amount of force can be transmitted directly to the master-cylinder piston by the actuating rod through the slide-valve member in order to provide an effective feedback between the master cylinder and the actuating rod (and brake pedal). It has been proposed to position a so-called "reaction disk" between the force-transmitting member and the valve body and slide-valve member which disk yielded somewhat during compression to cushion the reaction force. In general, the reaction disk was an elastomeric plate of mineral-oil-resistant rubber. Such systems have been found to be ineffective since the pressure-deformability characteristics of the reaction disk do not permit reaction force to be retransmitted to the vehicle operator with the desired degree of trueness and frequently drivers using power brakes of this type are disturbed by the lack of "feel" which is evidenced. Moreover, there is no appropriate distribution of the reaction force between the power piston and the slide-valve member so that the reaction response is often disproportionate to the relative effects of direct foot pressure and power-piston pressure. In addition, the semi-fluid material from which the reaction disk is composed has a limited resilient compressibility and thus is effective for only a relatively short stroke, has a tendency to deteriorate, and otherwise may be unacceptable.

It is, therefore, the principal object of the present invention to provide an improved vacuum-assist power-brake system wherein the aforementioned disadvantages can be avoided and which does not present any expensive or difficult construction problems.

A further object is to provide such a system providing greater sensitivity and control through an improved feedback system than even the above-described systems.

These objects and others which will become apparent hereinafter, are attainable in a vacuum-assist power brake of the general character described and in which the reaction disk is replaced by a force-transmission system effecting a distribution of the reaction force between the valve body (and the power cylinder connected thereto) and the slide-valve member to which the actuating rod is connected. This distribution can be produced, in accordance with one aspect of this invention, by a lever arrangement in which a double-arm lever is disposed between the force-transmitting rod and the valve assembly with one arm bearing upon the valve body, the other arm bearing upon the slide-valve member. Force distribution between the latter elements is determined by the relative lengths of these lever arms.

According to another aspect of this invention, the force-distributing transmission means constitutes a spring means including a pair of coaxial springs whose force constants determine the distribution ratio. One of the springs may be disposed between the force-transmitting member and the valve body (and power piston) while the other spring is positioned between the force-transmitting member and the slide-valve member.

In accordance with yet another aspect of the invention, a camming system is used, the camming system including a cam element controlled by the force-transmitting member and engaging ramp-like cam followers respectively connected with the valve body. In this case, force distribution is determined by the ratio of ramp angles.

A yet further aspect of the invention provides the force-transmitting means in the valve body. This valve body comprises two axially aligned portions between which a spring is mounted.

According to one extremely advantageous embodiment of the invention, a round elastic plug in the reaction disk between the valve body and the force-transmitting member comprises the force-transmitting means. Due to the deformation characteristics for this hard resilient plug, an extremely good feedback connection is obtained when it is flattened to the point of being level with the reaction disk, and only a slight connection between the valve body and the force-transmitting member exists at the onset of breaking.

These last two embodiments present the advantage that there is no lost motion of the brake pedal prior to braking action. They also spread the braking force from the pedal over a large part of their reaction disks thus making for a better force transmission between brake pedal and master cylinder.

The above and other objects, features and advantages of the present invention will become more readily apparent from the following description, reference being made to the accompanying drawing in which.

Figure 5:
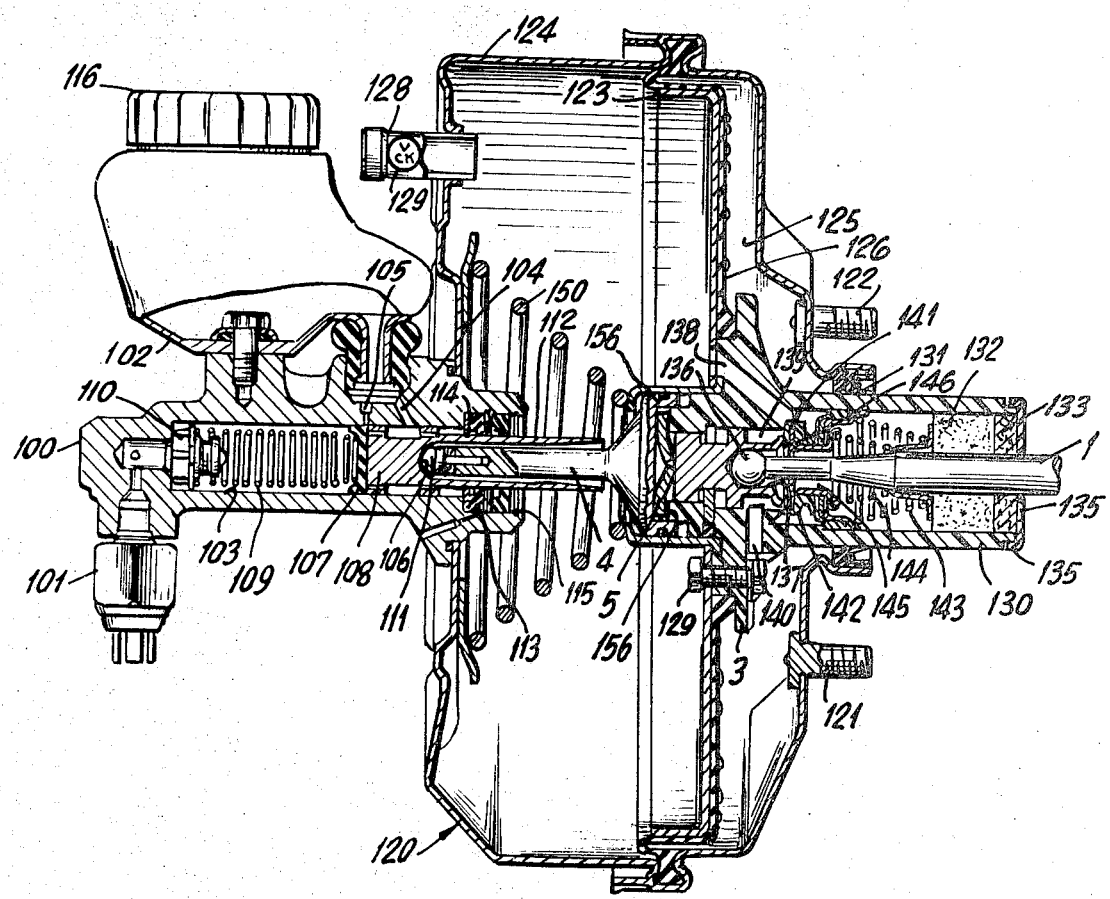
FIG. 5 is an axial cross-sectional view through a vacuum-assist power brake showing the relationship between the valve assemblies of FIGS. 1–4 and the remainder of the brake structure.

Referring first to FIG. 5 in which we show a vacuum-assist power brake in somewhat diagrammatic form and in axial cross-section, it can be seen that the system comprises generally the master cylinder 100 which is connected at 101 with the fluid-transmission lines delivering brake fluid to the wheel-brake cylinders in the usual manner. The master cylinder 100 is provided with a reservoir 102 for the brake fluid, the reservoir communicating with the cylinder bore 103 via a usual intake port 104 and a by-pass port 105 which may be closed by a cup 107 of a piston 108 when it is shifted to the left against the force of a return spring 109 to displace brake fluid past a check valve 110. The latter serves to maintain a predetermined super-atmospheric pressure in line 101 etc. and the wheel-brake cylinders, thereby decreasing the time required for pressure buildup during braking action. Upon release of the piston 108, any excess pressure in the lines is bled back past the check valve 110.

The piston 108 forms a socket 106 for the head 111 of a rod or link member 4 constituting the force-transmitting member between the vacuum-assist assembly and the master cylinder 100. Beyond the socket 106, the piston 108 is formed with a tubular axial extension 112 surrounding the rod 4 over the major part of its length and slidable in cylinder 100. A pair of rubber seals 113 are interposed between the sleeve 112 and the master cylinder 100, these elements being held in place between retainer rings 114 and 115. Brake fluid is added to the reservoir 102 upon removal of the cap 116.

The vacuum-assist assembly or vacuum-power brake is of the "vacuum-suspended" type in which a vacuum is applied to the front and rear chambers of the power-brake cylinder. The power cylinder of this "booster" brake comprises a relatively large-diameter drum 120 which is mounted by bolts 121 and 122 to a fixed part of the vehicle body and is subdivided internally by a vacuum piston 123 into a front chamber 124 and a rear chamber 125. The piston 123 is constituted as a metallic disk to which is affixed a rubber membrane 126 peripherally clamped at 127 within the drum 120. The master-brake cylinder 100 is mounted axially in the drum 120 whose front chamber 124 is maintained under reduced pressure by a line 128 communicating with the vacuum line of the engine. This vacuum line is generally connected to the intake manifold and is the reduced pressure resulting from the pumping action of the pistons. A check valve represented at 128a is provided in the vacuum line 128 of the brake system to ensure the maintenance of a reduced pressure at least in this front chamber 124 even when the engine is stopped. An additional "vacuum reservoir" is generally provided in the vacuum line of the engine to increase the duration of braking effectiveness when the engine is halted.

The piston 123 is mounted by bolts 129 upon a generally cylindrical slide-valve body generally designated 8 and provided with a tubular axial extension 130 which projects axially outwardly of the power cylinder 120. A seal 131 is disposed between the extension 130 and the wall of cylinder housing 120 to prevent pressure loss or gain in the rear chamber 125, but permitting axial movement of the extension 130 with the piston 123. The force from the brake pedal is applied to an axial shiftable actuating rod 1 which passes centrally through a porous block 132 and a fibrous air filter 133 at the open right-hand end of extension 130. Atmospheric air may enter this extension 130 through a vent 134 in a rubber dust cap 135 which otherwise closes this member. The rod 1 has a ball-shaped head 136 which is received in a socket 137 of a slide-valve member 2 axially shiftable in the valve body 3 as will be apparent hereinafter. A passage 138 through the piston 123 and the valve body 3 normally connects the front chamber 124 with the rear chamber 125 on opposite sides of the piston 123 via an annular clearance 139 around member 2, and a radial bore 140. Along this chain of channels, there is provided a valve seat 141 adapted to be closed by an annular flange 142 which forms a primary valve member axially shiftable in the extension 130. A pair o fconical coil springs 143 and 144, axially entrained at one end by the rod 1, bear with their other extremities upon the primary valve member 142. A clearance 145 around rod 1 permits air to flow into the socket 137 and, when the slide-valve member 2 is shifted to the left, around a seat 146 and into the rear chamber 125 via bore 140.

Figure 1:
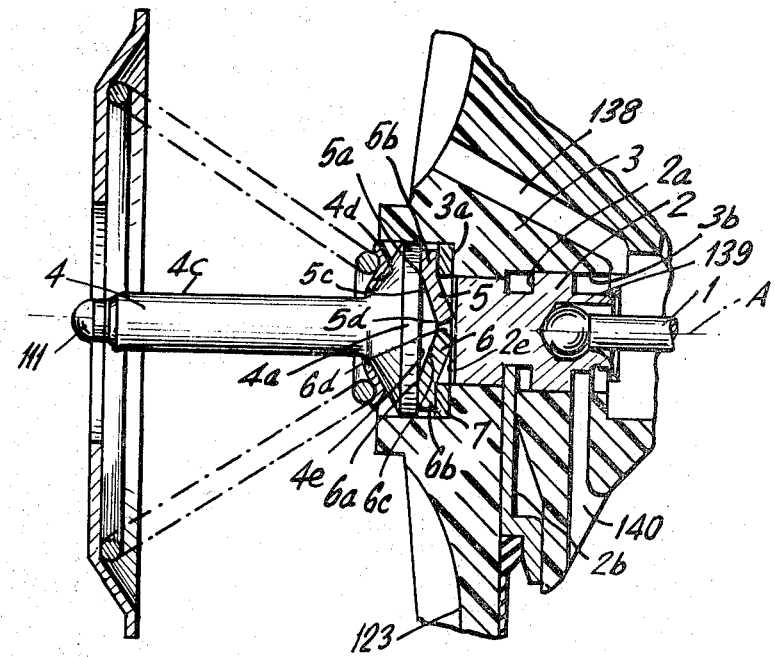
FIG. 1 is an axial cross-sectional view of a portion of a vacuum-assist power-brake system according to the present invention in which the force-distribution means is a lever arrangement.

Between the slide-valve member 2 and the valve body 3 and the force-transmitting member 4, there is provided a dished-disk spring 5 as is described in greater detail hereinafter with reference to FIGS. 1 and 6; to facilitate an understanding of this subject matter, however, a general description of the operation of the brake system is presented below. It should be noted that the mechanisms illustrated in FIGS. 1–4 may each be disposed between the member 4 and the members 2 and 3 of the brake system of FIG. 5 in accordance with this invention.

In the normal position of the vacuum-assist booster brake of FIG. 5, i.e. prior to actuation of member 1 by the brake pedal, the front chamber 124 is under reduced pressure from the engine vacuum line 128 and a fluid communication is permitted between this chamber and the rear chamber via passage 138, valve seat 141 and bore 140. The valve member 142 is in its extreme right-hand position and is thus backed off the valve seat 141. Since the pressure on both sides of the piston 123 is equal, the piston 123 is retained in its extreme right-hand position by the vacuum piston return spring 150. Correspondingly, spring 109 retains the master-cylinder piston 108 in its extreme right-hand position.

Upon depression of the brake pedal even slightly, rod 1 is shifted to the left to entrain the primary valve member 142 correspondingly until it engages the valve seat 141 and thereby cuts off rear chamber 125 from the source of vacuum. At the same time, valve member 2 shifts within the valve body 3 and air is permitted to bleed past the valve seat 146 into the rear chamber 125. A pressure differential thus develops between the chambers 124 and 125, the former remaining under the vacuum-line pressure, so that piston 123 is displaced to the left against the force of spring 150. The force contributed by the vacuum-assist cylinder in the brake-actuating direction is, of course, proportional to the product of the pressure differential and the surface area of the piston. As the piston 123 moves to the left together with the valve body 3, the force-transmitting member 4 is correspondingly entrained as is described in greater detail hereinafter. The member 4 shifts the master cylinder piston 108 to the left to drive brake fluid to the transmission line 101 and the wheel brake cylinders. Since the pressure differential is proportional to the extent to which and the duration for which the slide valve has been opened, a gradual or sudden brake actuation may develop as desired.

When the primary cup 107 of the master-cylinder piston 108 blocks the bypass bore 105 of the master cylinder 100, the brake pressure developed in chamber 103 applies a reaction force to the piston 108 and the force-transmitting rod 4. In prior constructions of vacuum-assist brakes, this reaction force was applied via a reaction disk of compressible material equally to the valve body and the slide-valve member, thereby establishing feedback. With this feedback, the valve member equivalent to member 2 was shifted to the right until it seated at 146 against member 142, thereby closing the vacuum passage 138 etc. and the air passage 145 etc. The resulting brake force was more or less proportional to the force sensed by the vehicle operator at the brake pedal over a very limited portion of its stroke.

For full and high-speed brake operation, e.g. in emergencies, the slide valve 2 is fully opened and rear chamber 125 vented substantially instantaneously to the atmosphere. The rapid development of the full-pressure differential across piston 123 provides an immediate maximum booster force which augments the rapidly applied and relatively strong brake force of the driver's foot in applying the brake at the master cylinders.

As is shown in greater detail in FIGS. 1-4, the present invention deals primarily with the relationship between the slide-valve piston or member 2, the valve body 3 and the force-transmitting member 4. Referring now to the detail view represented by FIG. 1, it can be seen that the valve body 3 of this invention is provided at its forward or left-hand end with an axially open annular recess 3a in addition to the axially extending chamber 3b. The cylindrical valve member 2 has a peripheral recess 2a whose flanks are engageable in extreme positions of this member with a plate 2b extending into this groove to limit the stroke of the slide valve. Behind this groove 2a, the clearance 139 is provided as has been described previously and may communicate with the discharge bore 140 and the vacuum passage 138. Only the forward end of the brake-actuating rod 1 is illustrated in this figure. The force-transmitting member 4, which actuates the master cylinder, has the rounded head 111 previously described for engagement in the master-cylinder piston 108, an elongated stem 4c adapted to project into the sleeve 112, and a conical end in force-transmitting relationship with the slide-valve member 2. This frustoconically enlarged end 4a is guided in the recess 3a and forms a seat for a spring plate 4d. The latter serves as the right-hand anchor for the return spring 150 of the piston 3, 123.

In accordance with an important aspect of this invention, the force-transmitting face 4e of the member 4 bears axially against a pair of rigid plates 5 and 6 whose marginal portions 5b lie in planes perpendicular to the axis A of the assembly and parallel to the surface 4e of member 4 and the corresponding surface 2e of the slide valve 2. Inwardly from these marginal portions 5b and 6b, the plates 5 and 6 are provided with obliquely inwardly extending flanges 5c and 6c, the bend-lines 5a and 6a forming ridges or fulcra bearing against the surface 4e. The free edges 5d and 6d abut the surface 2e of the pressure member 2 while the outer zones 5b and 6b of these plates bear directly upon the power piston 3, 123 via metallic force-transmitting ring 7. This ring functions as a pressure-distribution member and is particularly important when the valve body 3 is composed of a relatively soft material such as a synthetic resin, in which case it forms a wear-resistant bearing surface.

Figure 6:
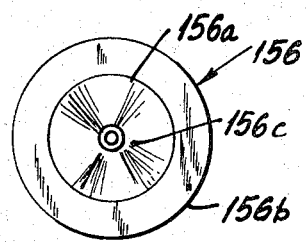
FIG. 6 is a plan view of the force-distributing member of FIG. 5.

An alternative arrangement using the same principle is illustrates in FIGS. 5 and 6. Here, the force-transmitting means is a dished disk 156 which is substituted for the plates 5 and 6 of FIG. 1. The lever ring 156 has a frustoconical central portion 156c bearing upon member 2 and a marginal portion 156b urged against the force-distributing ring 157 and against the valve body 3. The plates 5 and 6 and the disk 156 form double-arm levers whose fulcrums are represented by the bend-lines 5a, 6a and 156a. The long arms 5c, 6c and 156c of these levers cooperate with the pressure member 2 while the shorter arms 5b, 6b and 156b bear against the valve body 3. Advantageously, the plates 5 and 6 have little spring characteristic or are of such high stiffness that the force-transmission ratio between the member 4 and the slide valve 2 and between the member 4 and the valve body 3 is not altered by such effects as elastic yielding or plastic deformation. It will be evident that the motion of the mmeber 4 under the reaction force previously described and the resulting proportional transfer of force to the member 2 and the valve body 3 is essentially in proportion to the ratio of the vacuum-assist brake force to the direct brake-pedal force, thereby delivering to the operator a more truthful representation or feedback of the braking effect.

Figure 2:
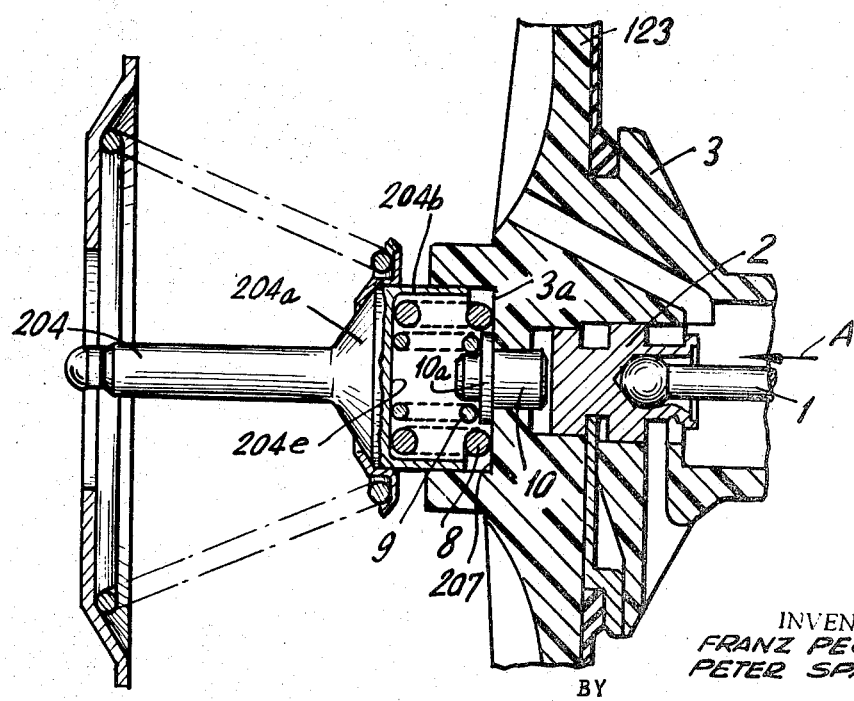
FIG. 2 is a detail view similar to FIG. 1 of the valve portion of another power-brake assembly wherein spring means, constituted by a pair of coil springs, forms the force-distribution arrangement.

In the system of FIG. 2, the force transmission between the rod 204 and the power-cylinder piston assembly 3, 123 is effected via a precompressed helical coil spring 8 of relatively large diameter and high stiffness. The spring 8 is seated against the shoulder 207 of the valve body 3 in the recess 3a at the left-hand end of the member and bears against the wall 204e of the conical base 204a of rod 204. A cylindrical axial extension 204b of this rod forms a sleeve slidable within the recess 203 and enclosing the spring 8, the sleeve 204b forming also a guide for member 204. A further spring 9 of relatively smaller stiffness and diameter rests against the surface 204e and bears upon a shoulder 10a of a pressure-transmitting pin 10 which is axially shiftable in the valve body 3 and is designed to engage the slide valve member 2 when the latter is urged forwardly by the actuating rod 1. The ratio of stiffness of the spring 9 to that of spring 8 is selected to correspond substantially to the relative effects of the brake pedal and the power-cylinder piston 3, 123 upon the rod 4 and the master cylinder piston. In this case, the major brake-force transmission is effected via the relatively large and stiff spring 8 while the principal portion of the reaction force is retransmitted to the piston 3, 123 by the spring. A minor portion of the reaction force, in the ratio indicated earlier, is delivered to the slide-valve member 2, the actuating rod 1 and the brake pedal via the spring 9 which is coaxially disposed within the spring 8. In this embodiment, the spring means includes one spring effective to transmit force between the valve body 3 and the force-transmission rod 4 and a further spring disposed between the slide-valve member 2 and this rod. By proper choice of the stiffness or Hooke's law coefficient of the inner spring 9, the feedback or "feel" delivered to the operator can correspond precisely to the brake response.

Figure 3:
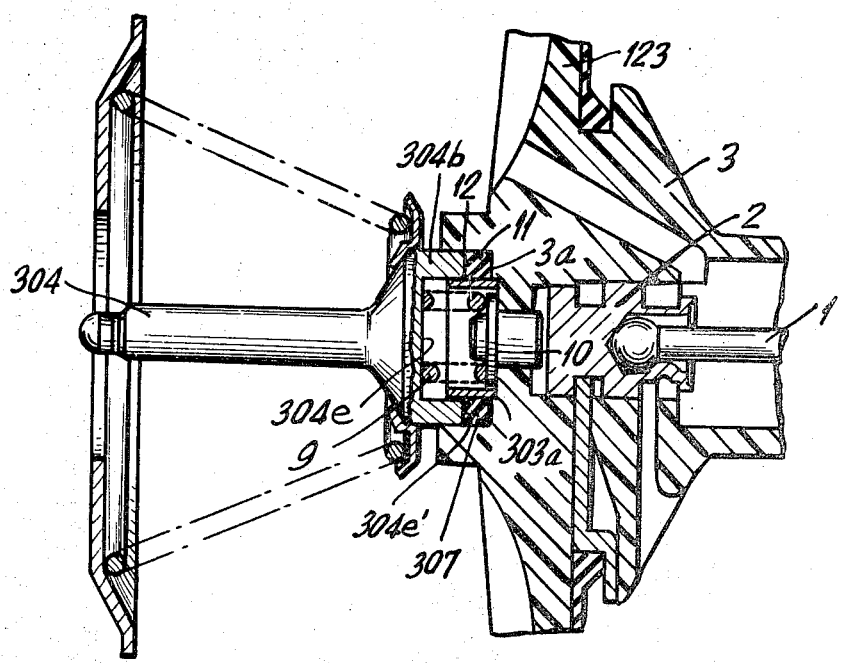
FIG. 3 is a cross-sectional view of yet another feedback or reaction-transmission arrangement in which one of the spring elements is a coil spring and the other is a rubber cushion.

In FIG. 3, we show a modification of the system in which the feedback response of the brake action is transmitted to the slide-valve member 2 via the force-transmission pin 10 and a spring 9 disposed within a cylindrical sleeve-like extension 304b of the force-transmission rod 304 while force transmission between the power-cylinder piston 3, 123 is effected via a rubber ring 11 disposed between the shoulder 307 of the recess 3a and the confronting end 304e' of the sleeve 304b. Spring 9 rests against the floor 304e of the interior of extension 304b. The rubber or elastomeric ring 11 is provided with a metallic positioning sleeve 12 which centers it in the recess 3a, the sleeve being seated in a cylindrical recess 303a. In this embodiment, the outer wall spring 8 of FIG. 2 is represented by the elastomeric ring 11 which has a similar compressibility law and function.

Figure 4:
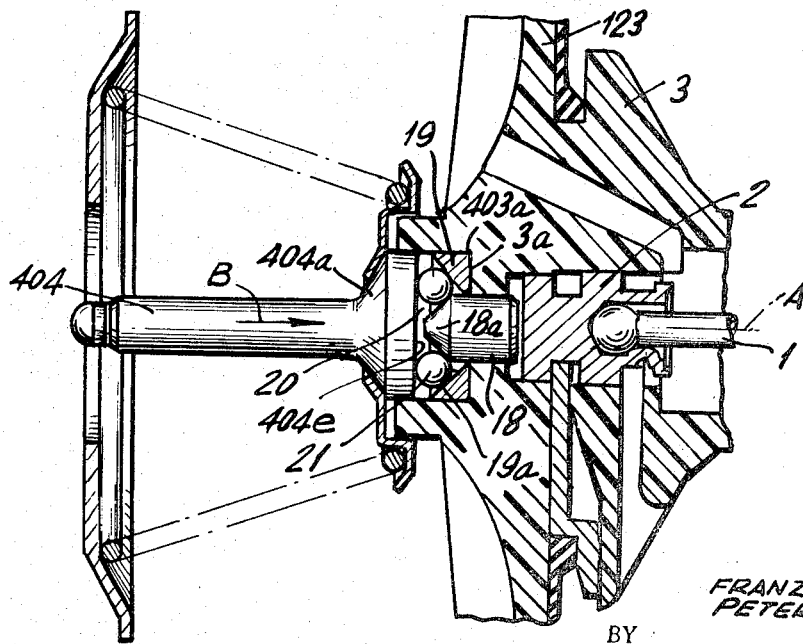
FIG. 4 is an axial cross-sectional view through the valve assembly of a vacuum-assist power brake using camming balls in the reaction-force transmission path.

In FIG. 4, the independent force transmission between the slide-valve member 2 and the valve body 3 to the member 404 or the reaction-force distribution between the members 2 and 3 is effected via a camming assembly disposed within the recess 3a. In this embodiment, a pin 18 is axially shiftable in the valve body 3 and designed to bear against the slide-valve member 2, this pin 18 having a conical tip 18a against which a plurality of angularly spaced camming balls 21, received in the cage 20 formed between the base 404a of member 404 and wall 403a of the recess 3a tend to bear inwardly. Outwardly of the pin 18, we provide a ring 19 with an inner frustoconical surface 19a against which the balls 21 rest. Thus, when the reaction force of member 404 is applied axially to the balls by the surface 404e perpendicular to the axis A (as represented by arrow B), it is distributed in dependence upon the angles of the conical surfaces 18a and 19a to the valve member 2 and the valve body 3 respectively.

Thus, the proportional distribution of the reaction force between the valve body 3 and the valve member 2 is effective over a relatively long stroke of the actuating member 1, the power-cylinder piston 3, 123 and the force-transmitting member 4, 104, 204, 304 or 404. In the system of FIGS. 1 and 5, the ratio of force distribution is determined by the ratio of the lengths of arms $5b:5c$, $6b:6c$ and $156b:156c$, the lengths being determined as distances from the fulcra 5a, 6a and 156a. In the systems of FIGS. 2 and 3, the force-distribution is determined by the ratio of the force constant $K_8:K_9$ and $K_{11}:K_9$, where $K_8$, $K_9$ and $K_{11}$ are respectively the force constants of the outer spring 8 (FIG. 2), the inner springs 9 (FIGS. 2 and 3) and the outer resiliently compressible ring 11 (FIG. 3). In the system of FIG. 4, the distribution is proportional to the ratio of $\cos \alpha : \cos \beta$ where $\alpha$ and $\beta$ are the half angles of the frusto-conical surfaces 19a and 18a, respectively. The characteristics of these force-transmitting systems, i.e. the response thereof with the stroke of rods 1 and 4 are independent of the characteristics of the materials from which the systems are composed, and of age and wear.

Figure 7:
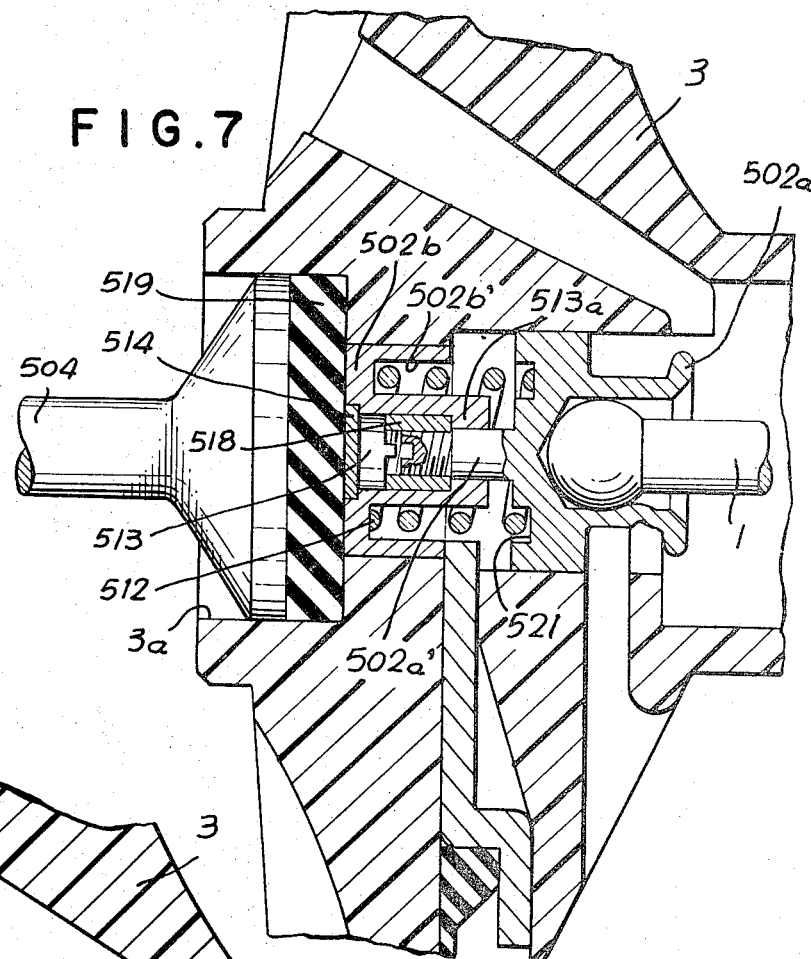
FIG. 7 is a cross-sectional view of yet another feedback arrangement wherein a two-part valve body is used and the force-distribution arrangement is a coil spring.

FIG. 7 shows a front portion 502b and rear portion 502a constituting a valve member. The rear portion is formed with a threaded axial projection 502a' and a circular groove 521. The front portion 502b is formed with an axial hole 513 and a circular groove 502b'. Inside the hole 513 is an inwardly projecting shoulder 513a. A precompressed spring 512 is braced between the two portions 502a and 502b seated in grooves 521 and 502b'. A nut 518 is screwed onto the end of the axial projection 502a' to prevent the two portions 502a and 502b from moving too far apart from each other by abutting the shoulder 513a. The end of the hole 513 is sealed by a metallic plate 514 so that the portion 502b bears against a disk 519 across the whole cross section of a bore 3a.

Actuation of the brake pedal moves the rod 1 to the left in FIG. 7 thereby triggering the normal power-braking operation while at the same time a certain component of the force of the rod 1 is immediately applied to the master cylinder through the spring 512. Heavy braking fully compresses the spring 512 and brings the two portions 502a and 502b into abutment so that the brake then functions directly as in the prior art arrangements.

Figure 8:
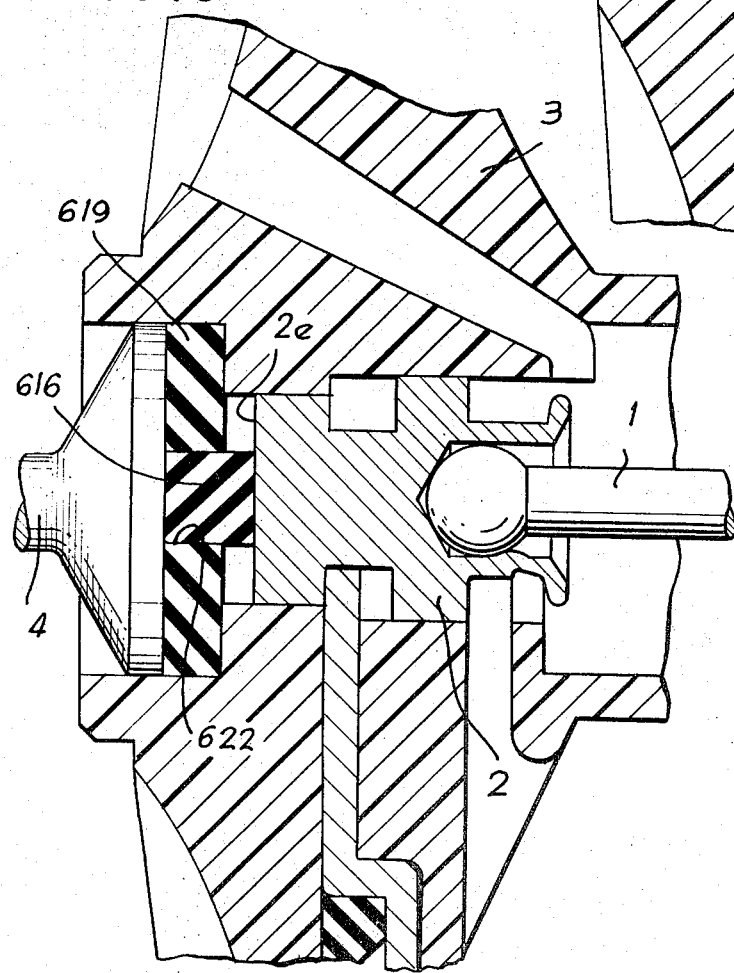
FIG. 8 is a cross-sectional view of yet another feedback arrangement wherein a resilient plug forms the force-distribution arrangement.

FIG. 8 shows an even simpler embodiment. Here a central boring 622 in a reaction disk 619 is merely fitted with a round hard resilient rubber plug 616. Due to the known deformation characteristics of rubber, this plug 616 transmits a greater component of force to the member 4 from the member 1 through the member 2 as it is more compressed. On full compression, it fills the boring 622 completely thereby effectively forming a component part of the reaction disk 619.

The invention described and illustrated is believed to admit of many modifications within the ability of persons skilled in the art, all such modifications being considered within the spirit and scope of the appended claims.

What is claimed is:

1. In a vacuum-assist power-brake system having a brake master cylinder, a power cylinder provided with a power piston subdividing said power cylinder into a pair of working chambers and shiftable in said power cylinder, a force-transmitting rod between said piston and said master cylinder for operating the latter upon movement of said piston, one of said chambers communicating with a source of subatmospheric pressure, valve means coupled with said power cylinder for respectively interconnecting said chambers and venting at least one of said chambers to the atmosphere for applying a pressure differential to said piston, the improvement wherein said valve means includes:

a valve body carried by said piston and provided with a bore aligned with and opening toward said rod;
a resilient reaction disk interposed between said rod and said bore;
an actuating member axially displaceable to operate the system;
a valve member operatively connected with said actuating member and shiftable relatively to said valve body in said bore, said valve member having a rigid face with a diameter substantially equal to that of said bore and confronting said disk over the entire cross-section of said bore; and
a resilient body between said rod and said valve member and bridging same to hold said face out of engagement with said disk in an unactuated condition of the system but yieldably compressible upon advance of said actuating member toward said rod while forming a continuously effective force-transmitting element between them, said face engaging said disk upon compression of said resilient body whereby force is transmitted between said rod and said valve member via said disk over said entire cross section.

2. The improvement defined in claim 1 wherein said disk has an axial bore, and said resilient body is a resilient plug compressible between said valve member and said force-transmitting rod and received in the axial bore of said disk.

3. The improvement defined in claim 2 wherein said plug has an axial thickness greater than that of said reaction disk and projects therefrom toward said valve member.

4. The improvement defined in claim 3 wherein said plug has a round cross section.

5. The improvement defined in claim 4 wherein said plug and said reaction disk are so arranged and constructed that, on braking, said plug is flattened against said reaction disk to form an integral unit therewith.

References Cited

UNITED STATES PATENTS

| | | | |
|---|---|---|---|
| 3,013,536 | 12/1961 | Cripe | 60—54.6PX |
| 3,321,915 | 5/1967 | Martin | 60—54.5P |
| 3,362,298 | 1/1968 | Julow | 60—54.6PX |
| 3,382,676 | 5/1968 | Tenniswood | 60—54.6P |
| 3,143,927 | 8/1964 | French et al. | 91—369AX |
| 3,312,147 | 4/1967 | Reichard | 91—369A |

MARTIN P. SCHWADRON, Primary Examiner

R. BUNEVICH, Assistant Examiner

U.S. Cl. X.R.

91—369